United States Patent Office 3,156,501
Patented Nov. 10, 1964

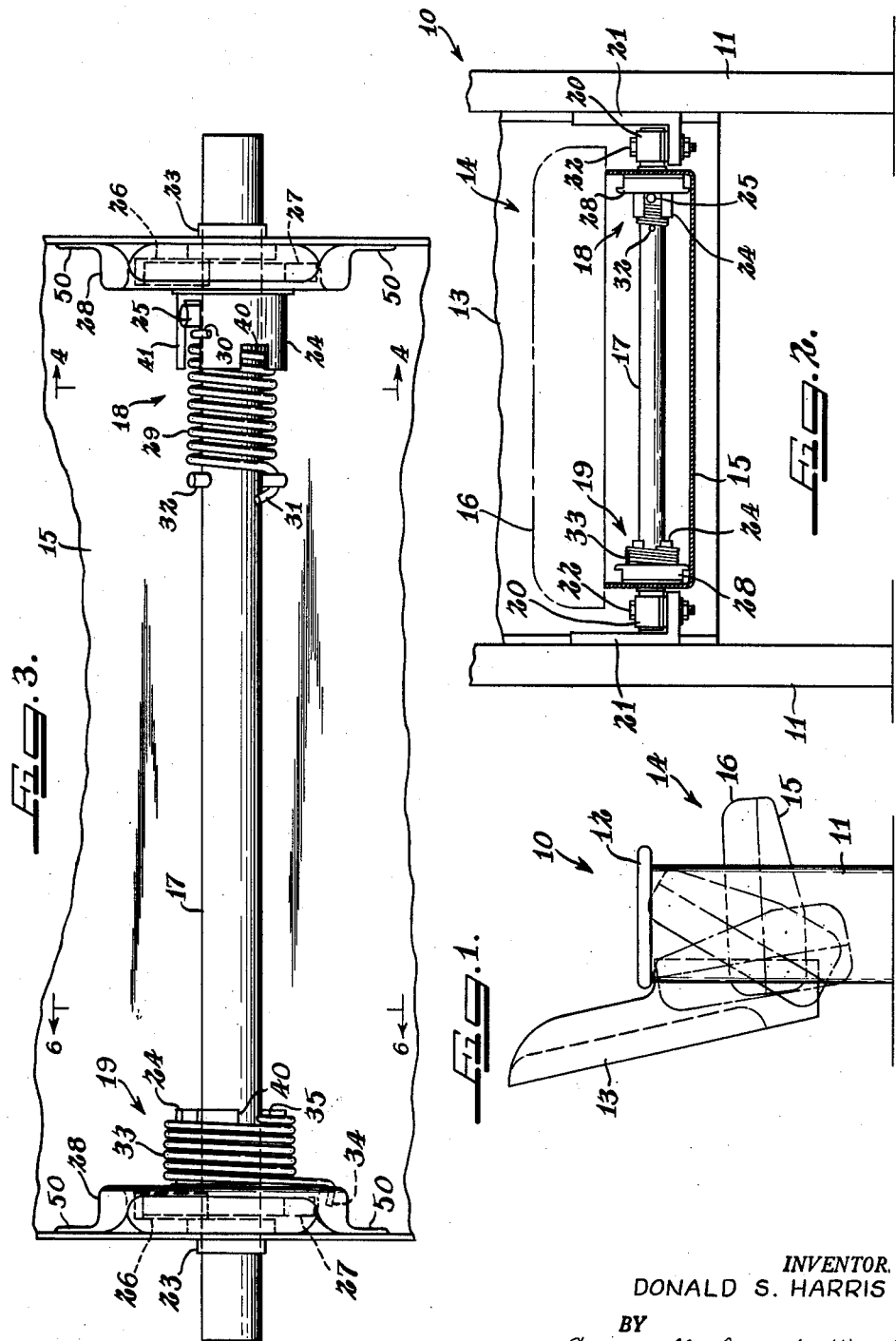

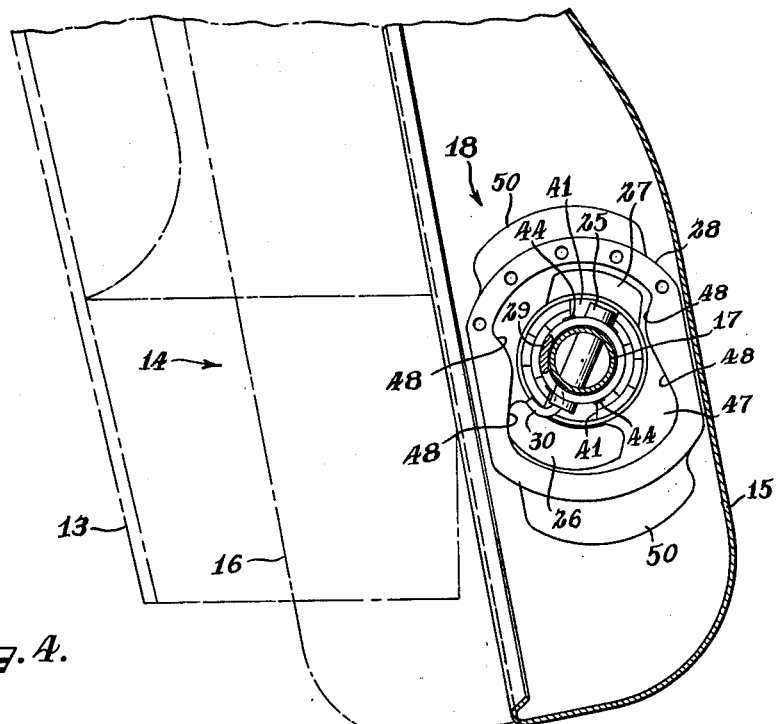

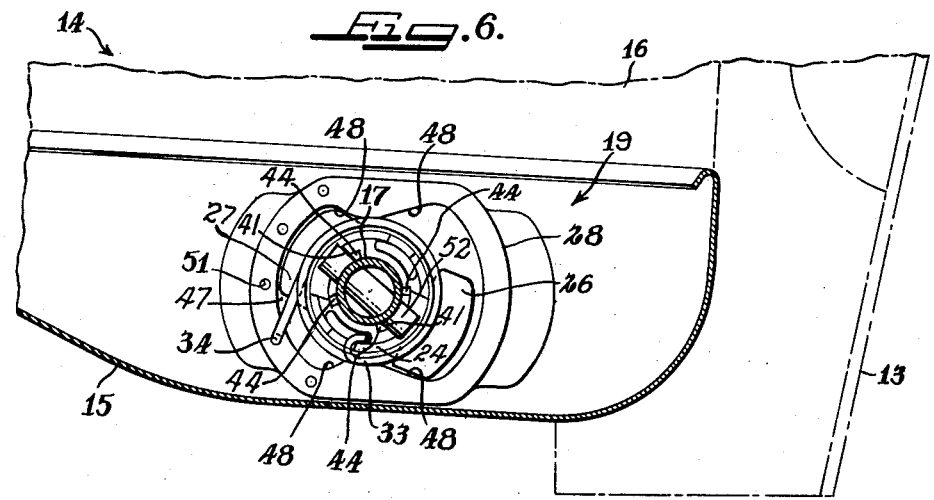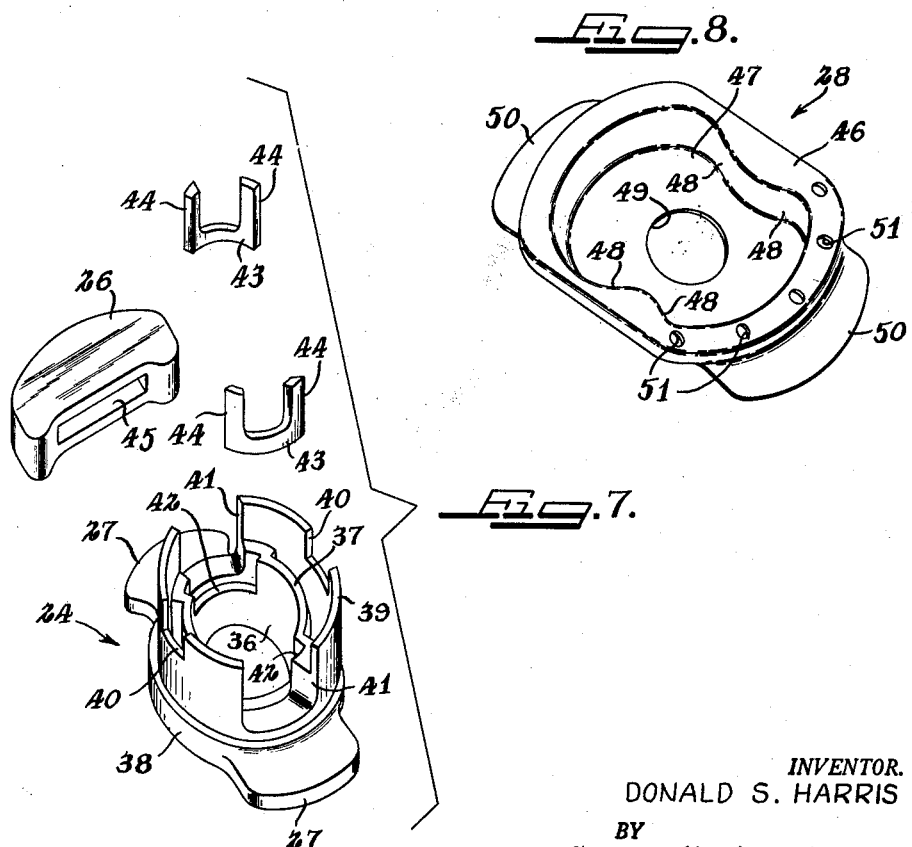

3,156,501
ADJUSTABLE SEAT MOUNTING ARRANGEMENT
Donald S. Harris, New Castle, Ind., assignor to Peabody Seating Company, Inc., North Manchester, Ind., a corporation of Indiana
Filed Aug. 6, 1962, Ser. No. 214,998
4 Claims. (Cl. 297—333)

This invention is directed to a new and improved adjustable seat mounting and hinge arrangement particularly adapted for use with auditorium-type seat structures. More specifically, the invention deals with a seat mounting hinge arrangement of unique design providing for controlled unassisted positioning of the seat in a vertically inclined neutral position and permitting controlled substantially vertical storage or retraction positioning of the seat as well as substantially horizontal operative positioning of the seat.

It is an object of the invention to provide a new and improved adjustable seat structure including as a part thereof a seat mounting and hinging arrangement of new and improved design.

A further object is to provide a seat mounting hinge arrangement of uncomplicated design and assembly, the arrangement providing for automatic seat adjustment to a convenient position during non-use thereof, and further providing for efficient and ready positioning of the seat to accommodate individual passing thereof when the seat is in use as well as accommodate full use of the seat in the down operative position.

Another object is to provide a new and improved seat mounting arrangement particularly adapted for use with a plurality of abreast seats of the auditorium-type for rigid interconnection of the supporting standards of the seats, the mounting arrangement including unique seat operational control means.

Still another object is to provide a new and improved seat mounting arrangement permitting ready operational movement of a seat into and out of three different positions, the movement being cushioned and controlled in a new and improved manner.

Other objects not specifically set forth will become apparent from the following detailed description of the invention made in conjunction with the accompanying drawings wherein:

FIG. 1 is a diagrammatic side elevation of an auditorium-type seat structure including as a part thereof the seat mounting arrangement of the present invention, this view illustrating the various positions of the seat as controlled by the mounting arrangement;

FIG. 2 is an enlarged fragmentary front elevation of the structure of FIG. 1 illustrating the seat in transverse section and in the horizontal operative position;

FIG. 3 is a fragmentary enlarged plan view of the seat pan illustrating the assembled hinge arrangement of the invention;

FIG. 4 is a partial diagrammatic section of the hinge arrangement as viewed generally along line 4—4 in FIG. 3 illustrating the portion of the arrangement providing controlled movement of the seat to and from the neutral and fully raised position;

FIG. 5 is a view similar to FIG. 4 illustrating the operation of the hinge arrangement in the fully raised position of the seat;

FIG. 6 is a view similar to FIGS. 4 and 5 illustrating another portion of the hinge arrangement operative in controlling movement of the seat to and from the neutral and down positions, this view being taken generally along line 6—6 in FIG. 3;

FIG. 7 is an exploded perspective of a unique form of stop means forming a part of a hinge arrangement; and FIG. 8 is a perspective of a stop housing also forming a part of the hinge arrangement.

FIG. 1 illustrates an auditorium-type seat structure 10 including the special seat mounting and hinge arrangement of the present invention. The seat structure generally includes a pair of transversely spaced, vertical standards 11 carrying at the top thereof seat arms 12 and mounting therebetween a fixed seat back 13 and an adjustable seat 14. The seat 14 basically includes an upwardly opening dish-shaped pan or carriage 15 in which the hinge arrangement of the present invention to be described is mounted, the top of the pan having attached thereto a seat cushion 16 of any suitable type. The seat 14 as shown in FIG. 1 is operative between three hinge controlled positions, namely a neutral position wherein the seat is vertically inclined at an angle of about 60°, a substantially vertical storage position wherein the seat is at an angle of between 90° and 100° measured in a counter-clockwise direction, and a substantially horizontal down or operative position wherein the seat is approximately inclined 3° from the horizontal.

Referring to FIG. 2, the seat 14 is illustrated in its horizontal down position to best show the mounting thereof to the standards 11. The seat pan 15 has therein the seat mounting or hinge arrangement of the invention which includes a transverse, straight-through fixed shaft 17 mounting adjacent one side of the pan an up-position return spring unit 18 and adjacent the other side of the pan a down-position return spring unit 19. The shaft 17 extends through the opposite side walls of the pan 15 and is fixed in shaft or axle clamps 20 at opposite projecting ends thereof and with the clamps is fixed to L-shaped brackets 21 carried by the standards 11. Any suitable shaft attaching arrangement may be used in fixing the shaft 17 to the standards 11. The particular arrangement illustrated includes fasteners 22 extending through the shaft clamps 20 and bottom horizontal legs of the brackets 21.

The fixed shaft 17 may be solid or tubular and in either case provides transverse rigidity to the seat structure between the standards 11. Depending on the overall weight of the seat structure, no special standard-floor attachments need be used. The straight-through shaft 17 may also be readily extended through the brackets 21 and standards 11 in the form of a single substantially elongated shaft for use in connecting a plurality of seat structures in abreast relation. This preferred continuous shaft structure is readily accommodated by or forms a part of the special hinge arrangement of the present invention. Thus the return spring units 18 and 19 are of special design to accommodate single shaft mounting thus imparting to the preferred form of the seat mounting arrangement the additional advantage of standard stabilization.

As best shown in FIG. 3, the ends of the shaft 17 projecting through the opposite side walls of the pan 15 extend through sleeve-type bushings 23 which may be formed from nylon or other suitable self-lubricating material. The return spring unit 18 best illustrated in FIGS. 3–5 consists generally of a floating sleeve-like stop means or stop dog 24 hereinafter to be referred to as a floating sleeve. This sleeve is mounted on the shaft 17 for limited pivotal or rotational movement relative thereto as controlled by a stop pin 25 extending transversely through the shaft with its opposite ends projecting therefrom. The floating sleeve 24 also includes as a part thereof a projecting resilient bumper 26 and a spaced projecting positive stop 27. The portion of the floating sleeve 24 carrying the bumper 26 and stop 27 is received in a special housing 28 which includes opposed abutment means of a type to be described which are operative with the bumper 26 and stop 27. The housing 28 is fixed to the inner surface of the adjacent side wall of the pan 15. A coil spring 29 extends from the interior of the floating sleeve 24 about the shaft 17 and at one end 30 thereof is in engagement with the floating sleeve 24, and at the other end 31 thereof is in engagement with a pin 32 extending transversely through the shaft 17.

The return spring unit 19 best shown in FIGS. 3 and 6 also includes a floating sleeve 24 of the same structure as previously described including an oppositely projecting bumper 26 and positive stop 27 received in an identical housing 28 fixed to the opposite side wall of the pan 13. A coil spring 33 is received about the outer surface of the floating sleeve 24 and one end 34 thereof is attached to the housing 28 whereas the other end 35 thereof is attached to the floating sleeve 24.

The type of floating sleeve 24 used in each of the return spring units 18 and 19 is illustrated in FIG. 7. This sleeve may be readily formed as a casting and includes a central bore 36 of a diameter which is sufficiently greater than the diameter of the shaft 17 to be loosely received thereabout. The bore 36 is defined by an inner sleeve portion 37 which is integrally joined with the base 38, as viewed, and which receives thereabout in interrupted and radially spaced relation an outer sleeve portion 39 also integrally formed with the base 38. The inner and outer sleeve portions 37 and 39 need not be spaced as illustrated, but this design is readily accommodated by standard casting operations and the amount of material used in the floating sleeve is thus materially reduced.

The outer sleeve portion 39 is formed with groove-like interruptions 40 along one end thereof providing a plurality of axially projecting lug portions to which the end 35 of the coil spring 33 can be readily connected. A pair of deep grooves 41 are formed in the floating sleeve 24 to readily accommodate attachment of the end 30 of the coil spring 29. The deep grooves 41 also receive therein the opposite ends of the transverse pin 25 carried by the shaft 17.

The inner sleeve portion 37 is formed with radially inwardly and axially opening recesses 42 which are oppositely positioned and are aligned with the oppositely positioned deep grooves 41. These recesses are dimensioned to mount therein arcuately shaped cushions 43 which are also of generally U-shape. The cushions 43 may be formed from any suitable non-metallic material, such as nylon, the parallel legs 44 of the cushions being dimensioned to project radially from the recesses 42 into outwardly overlapping position along the side edges of the deep grooves 41.

The base portion 38 of the floating sleeve 24 has integrally formed therewith outwardly projecting positive stops 27 one of which is adapted to mount thereon the resilient bumper 26. This bumper may be formed from any suitable resilient material, such as rubber or the like, and is readily molded to the shape illustrated to include a central opening 45 frictionally receiving therein one of the positive stops 27.

Each housing 28 is in the form of a single stamping as shown in FIG. 8. The housing includes on outer flat peripheral flange 46 surrounding a central recess 47 which is of generally "figure eight" shape including angled opposed abutment surfaces designated by the numeral 48. One end of the central recess 47 is larger than the other end, the larger end receiving therein the bumper 26 of a floating sleeve 24. The housing 28 is formed with a central aperture 49 through which the shaft 17 is received and is further provided with oppositely projecting attachment ears 50 by means of which the stamping may be fixedly secured, such as by welding, to a side wall of the pan 15. The peripheral flange 46 in one portion thereof includes a plurality of spaced apertures 51 through which the end 34 of the spring 38 may be received. The plurality of apertures 51 as well as the plurality of spring locking recesses 40 of the floating sleeve 24 provide means whereby adjustable mounting of the springs 29 and 33 may be obtained.

The connection of the spring 29 of the return spring unit 18 is such that this spring is tensioned when the seat 14 is raised from the neutral position of FIG. 4 to the past-vertical position of FIG. 5. This would occur when the occupant of the seat structure 10 stands up and pushes the seat 14 back toward the seat back 13 to provide passing room for individuals along the aisle. The tensioning of the spring 29 results in the storage of sufficient energy to provide for automatic return of the seat 14 to its neutral position upon release thereof.

FIG. 4 illustrates the position of the various elements of the return spring unit 18 in the neutral position of the seat 14. The floating sleeve 24 is held by the spring 29 acting between the sleeve and the fixed pin 32 (shown in FIG. 3) in abutment with the pin 25 along opposed sides of the opposite deep grooves 41. Thus the pin 25 is in cushioned abutment with the legs 44 of the cushions 43 mounted in the deep grooves 41 of the floating sleeve. The resilient bumper 26 carried by the floating sleeve 24 is in one end engagement with an abutment surface 48 of the housing 28.

Upward movement of the seat 14 into the position shown in FIG. 5 results in rotation of the floating sleeve 24 with the housing 28 by reason of continued abutment of the same end of the bumper 26 with the same abutment surface of the housing 28. Any appreciable compression of the bumper 26 will result in engagement of the diagonally opposite edge of the uncovered positive stop 27 with the adjacent abutment surface 48 of the housing 28 thus providing for back-up positive operation of a seat and hinge arrangement.

The floating sleeve 24 rotates about the shaft 17 with the housing 28 until the pin 25 engages the opposite surfaces of the opposed deep grooves 41 including the legs 44 of the cushions therein. Thus the pin 25 on the fixed shaft 17 provides a positive stop cushioned by the cushion legs 44 when the seat is moved into its vertically raised position as shown in FIG. 5. As a result of such movement, sufficient energy is stored in the spring 29 to return the seat 14 to its neutral position upon release thereof.

By reason of the spring 33 of the return spring unit 19 being connected between the floating sleeve 24 thereof and the adjacent housing 28, the raising of the seat to the vertical position as described above does not result in tensioning of the spring 33 as this floating sleeve 24 rotates with the housing 28 in association therewith. This rotation is afforded by reason of the bumper 26 of the floating sleeve 24 of the return spring unit 19 being in engagement with an adjacent abutment surface 48 of the housing 28 in the same manner as described in connection with the return spring unit 18. Thus both bumpers 26 of the respective floating sleeve 24 are operative in cushioning the raising of the seat from the neutral position to the vertical position. Furthermore, as shown in FIG. 6, the shaft 17 includes a transverse pin 52 which projects into the opposite deep grooves 41 of the floating sleeve 24 and is operative in the same manner as the pin 25 previously described in abutting with the oppositely positioned legs 44 of the cushions 43 mounted in the deep grooves 41. Thus both floating sleeves 24 rotate relative to the fixed shaft 17 with their respective housings 28 when the seat moves between the neutral and raised positions, the extent of rotation of the floating sleeves being limited by their respective pins 25 and 52, and any noisy metallic contact between the pins and floating sleeve being eliminated by the cushions 43. However, in movement between the neutral and raised positions only the spring 29 of the return spring unit 18 is operative in storing or releasing energy.

FIG. 6 illustrates operation of the return spring unit 19 during movement of the seat 14 between the neutral and down position. The pin 52 remains in engagement with the same diagonal surfaces of the deep grooves 41 of the floating sleeve 24 throughout movement between these positions. The particular mounting of the spring 33 between the floating sleeve 24 and housing 28 maintains this fixed engagement which results in the floating sleeve 24 being fixed relative to the shaft and merely the housing 28 pivoting with the seat pan 15 about the shaft. Such pivoting results in the tensioning of the spring 33 and the storing of sufficient energy therein to return the seat 14 to its neutral position upon release thereof.

During relative pivoting between the housing 28 and floating sleeve 24, the housing changes its position relative to the bumper 26 and the oppositely projecting positive stop 27 of the floating sleeve 24. This then results in an opposite edge of the bumper 26 becoming ultimately engaged with an opposite abutment surface 48 of the housing 28 when the seat reaches its down position. The application of weight on the seat can ultimately result in the positive stop 27 becoming engaged with an adjacent abutment surface 48 thus providing means whereby the total possible downward movement of the seat is limited.

The various components of the return spring unit 18 function similarly to the components of the return spring unit 19 when the seat is moved between the neutral and down position. However, the one distinct difference exists in that the spring 29 is unaffected by such movement because, as explained above, the floating sleeve 24 does not rotate or pivot relative to the fixed shaft 17. Thus with downward movement of the seat from the neutral position, both of the bumpers 26 of the pair of floating sleeves 24 function to cushion the final positioning of the seat with the respective positive stops 27 being available to completely limit the extent of downward movement.

The foregoing movable seat hinge arrangement is of uncomplicated design and yet is capable of providing positive control during multiple positioning of the seat. Substantially all of the elements of the return spring units 18 and 19 are identical thus providing for economy in fabrication and assembly. All of the positive stops as well as the cushioning means are protectively housed by the various parts thus minimizing the possibility of foreign matter accumulation of an extent which could be disruptive of the continued efficient operation of the arrangement. Furthermore, all of the moving parts are protectively housed or are located so as to be inaccessible thus precluding tampering as well as clothing or personal damage to the user of the seat. The arrangement provides for complete cushioning in all positions of the seat thus eliminating operational noise and yet backing up such cushioning with positive stops to provide complete control over all aspects of seat operation. There are no lubrication problems present. The rigid fixed axle or shaft arrangement prevents binding and assures perfect alignment of the cooperating parts irrespective of local floor conditions. The springs provide for counterbalancing of the seat in its neutral position and the effective length of the springs may vary depending upon the degree of energy storing capabilities required.

Obviously certain modifications and variations of the invention as hereinbefore set forth may be made without departing from the spirit and scope thereof, and, therefore, only such limitations should be imposed as are indicated in the appended claims.

I claim:

1. In an auditorium-type seat structure wherein a seat is mounted for pivotal movement from an inclined neutral position to a vertical storage position and a horizontal operative position relative to a back, said seat and back being supported by spaced standards, the provision of a hinge arrangement comprising fixed shaft means extending between said standards, said seat being mounted on said shaft means for pivoting thereabout, spaced first and second floating sleeve-type stop means mounted on said shaft means for limited pivotal movement relative to said shaft means, spaced abutment means carried by said seat in association with each of said stop means to limit pivoting of said seat relative to said stop means, radial pin means carried by said shaft means and positioned for engagement with spaced surfaces of each of said stop means to limit pivoting of said stop means relative to said shaft means in both clockwise and counterclockwise directions, each of said stop means including a spaced resilient bumper and positive stop confined for limited movement between the spaced abutment means carried by said seat during movement of said seat from a neutral position, said bumpers and positive stops being positioned for engagement with said abutment means to fix said stop means relative to said seat, first spring means interconnecting said first stop means with said seat, and second spring means interconnecting said second stop means with said shaft means, said first spring means being mounted for tensioning when said seat is moved from the neutral position to the horizontal operative position, said second spring means being mounted for tensioning when said seat is moved from the neutral position to the vertical storage position.

2. In an auditorium-type seat structure wherein a seat is mounted for pivotal movement from an inclined neutral position to a vertical storage position and a horizontal operative position relative to a back, said seat and back being supported by spaced standards, the provision of a hinge arrangement comprising fixed shaft means extending between said standards, said seat being mounted on said shaft means for pivoting thereabout, spaced first and second floating sleeve-type stop means mounted on said shaft means for limited pivotal movement relative to said shaft means, spaced abutment means carried by said seat in association with each of said stop means to limit pivoting of said seat relative to said stop means, radial pin means carried by said shaft means and positioned for engagement with spaced surfaces of each of said stop means to limit pivoting of said stop means relative to said shaft means in both clockwise and counterclockwise directions, each of said stop means including a spaced resilient bumper and positive stop confined for limited movement between the spaced abutment means carried by said seat during movement of said seat from a neutral position, said bumpers and positive stops being positioned for engagement with said abutment means to fix said stop means relative to said seat, first spring means interconnecting said first stop means with said seat, and second spring means interconnecting said second stop means with said shaft means, said first spring means being mounted for tensioning when said seat is moved from the neutral position to the horizontal operative position, said second spring means being mounted for tensioning when said seat is moved from the neutral position to the vertical storage position, the bumper of said first stop means being engaged with an abutment means during movement of said seat to the vertical storage position to fix said first stop means relative to said seat, the bumper of said second stop means being engaged with an abutment means during movement of said seat to the vertical storage position to provide for pivoting of said second stop means relative to said shaft means.

3. In an auditorium-type seat structure wherein a seat is mounted for pivotal movement from an inclined neutral position to a vertical storage position and a horizontal operative position relative to a back, said seat and back being supported by spaced standards, the provision of a hinge arrangement comprising fixed shaft means extending between said standards, said seat being mounted on said shaft means for pivoting thereabout, spaced first and second floating sleeve-like stop means mounted on said shaft means for limited pivotal movement relative to said shaft means, spaced abutment means carried by said seat in association with each of said stop means to limit pivoting of said seat relative to said stop means, radial pin means carried by said shaft means and positioned for engagement with spaced surfaces of each of said stop means to limit pivoting of said stop means relative to said shaft means in both clockwise and counterclockwise directions, each of said stop means including a spaced resilient bumper and positive stop confined for limited movement between the spaced abutment means carried by said seat during movement of said seat from a neutral position, said bumpers and positive stops being positioned for engagement with said abutment means to fix said stop means relative to said seat, first spring means interconnecting said first stop means with said seat, second spring means interconnecting said second stop means with said shaft means, said first spring means being mounted for tensioning when said seat is moved from the neutral position to the horizontal operative position, said second spring means being moutned for tensioning when said seat is moved from the neutral position to the vertical storage position, and cushion means carried by said stop means for engagement with said pin means prior to engagement thereof with the spaced surfaces of said stop means.

4. In an auditorium-type seat structure wherein a seat is mounted for pivotal movement from an inclined neutral position to a vertical storage position and a horizontal operative position relative to a back, said seat and back being supported by spaced standards, the provision of a hinge arrangement comprising fixed shaft means extending between said standards, said seat being mounted on said shaft means for pivoting thereabout, spaced first and second floating sleeve-like stop means mounted on said shaft means for limited pivotal movement relative to said shaft means, spaced abutment means carried by said seat in association with each of said stop means to limit pivoting of said seat relative to said stop means, radial pin means carried by said shaft means and positioned for engagement with spaced surfaces of each of said stop means to limit pivoting of said stop means relative to said shaft means in both clockwise and counterclockwise directions, each of said stop means including a spaced resilient bumper and positive stop confined for limited movement between the spaced abutment means carried by said seat during movement of said seat from a neutral position, said bumpers and positive stops being positioned for engagement with said abutment means to fix said stop means relative to said seat, first spring means interconnecting said first stop means with said seat, second spring means interconnecting said second stop means with said shaft means, said first spring means being mounted for tensioning when said seat is moved from the neutral position to the horizontal operative position, said second spring means being mounted for tensioning when said seat is moved from the neutral position to the vertical storage position, and cushion means carried by said stop means for engagement with said pin means prior to engagement thereof with the spaced surfaces of said stop means, the bumper of said first stop means being engaged with an abutment means during movement of said seat to the vertical storage position to fix said first stop means relative to said seat, the bumper of said second stop means being engaged with an abutment means during movement of said seat to the vertical storage position to provide for pivoting of said second stop means relative to said shaft means, the bumper of each of said stop means being placed in engagement with a spaced abutment means upon movement of said seat into the horizontal operative position.

References Cited in the file of this patent
UNITED STATES PATENTS

| | | |
|---|---|---|
| 2,063,836 | Bromagen | Dec. 8, 1936 |
| 2,455,262 | Morgan | Nov. 30, 1948 |
| 2,500,135 | Nordmark | Mar. 7, 1950 |